United States Patent [19]
Hohmann

[11] Patent Number: 5,489,125
[45] Date of Patent: Feb. 6, 1996

[54] QUICK CONNECT COUPLING FOR CONNECTING TWO FLUID CONDUITS

[75] Inventor: Ralf Hohmann, Bruchköbel, Germany

[73] Assignee: Rasmussen GmbH, Maintal, Germany

[21] Appl. No.: 316,215

[22] Filed: Sep. 30, 1994

[30] Foreign Application Priority Data

Sep. 30, 1993 [DE] Germany .................. 43 33 273.0

[51] Int. Cl.$^6$ .................................................. F16L 37/08
[52] U.S. Cl. ...................... 285/81; 285/316; 285/319; 285/308
[58] Field of Search .............................. 285/319, 307, 285/308, 314, 315, 316, 81

[56] References Cited

U.S. PATENT DOCUMENTS

| | | | |
|---|---|---|---|
| 3,847,421 | 11/1974 | Eschbaugh et al. | 285/353 |
| 4,610,468 | 9/1986 | Wood | 285/307 |
| 4,966,398 | 10/1990 | Peterson | 285/316 |
| 5,141,263 | 8/1992 | Varden | 285/307 |
| 5,310,226 | 5/1994 | Norkey | 285/316 |
| 5,318,332 | 7/1994 | Hohmann et al. | 285/307 |
| 5,323,811 | 6/1994 | Hohmann et al. | |
| 5,324,081 | 6/1994 | Umezawa | 285/319 |
| 5,366,259 | 11/1994 | Hohmann et al. | 285/316 |

FOREIGN PATENT DOCUMENTS

0532242A2   4/1992   European Pat. Off.

*Primary Examiner*—Eric K. Nicholson
*Attorney, Agent, or Firm*—Darby & Darby

[57] ABSTRACT

A quick connect coupling for connecting two fluid conduits has a coupling ring form-lockingly connected to a sleeve which embraces the first fluid conduit between two corrugations and is provided with elastically flexible retaining arms. The arms can grip a radial securing surface of the second fluid conduit upon axial engagement of the fluid conduits to form an axial connection therebetween. A sealing ring is arranged in an annular space delimited by the mutually engaged fluid conduits, an inner shoulder of the second conduit and the front corrugation. The second conduit has a conical flank which widens radially towards its free end. In order to reduce the amount of material used on the side of the second conduit while ensuring that there is sufficiently high resistance to lateral deflection of the first conduit within the second conduit, the corrugation next to the front end of the second fluid conduit bears upon the inner face of the second conduit after insertion of the first conduit into the second conduit. A correspondingly conically shaped face of one end of the sleeve bears on the radially widening flank of the second conduit after insertion of the first conduit into the second conduit.

3 Claims, 1 Drawing Sheet

QUICK CONNECT COUPLING FOR CONNECTING TWO FLUID CONDUITS

FIELD OF THE INVENTION

This invention relates generally to a quick connect coupling for connecting a first fluid conduit to a second fluid conduit and more particularly to a quick connect coupling having a coupling ring which is form-lockingly connected to a sleeve and embraces the first fluid conduit between two corrugations. The coupling ring has elastically flexible retaining arms which grip a radial securing surface of the second fluid conduit upon coaxial engagement of the first and second conduits to form an axial connection.

BACKGROUND OF THE INVENTION

A previously proposed quick connect coupling of this kind is disclosed in European Patent No. EP-A-0 532 242. Upon insertion of the first fluid conduit in the second fluid conduit, the sleeve embraces the first conduit and is inserted completely into an end section of the second conduit. The length of the end section is at least equal to the length of the sleeve. This ensures that the first conduit is sufficiently supported against lateral deflection in the second conduit. In addition, the coupling ring engages the inside of the second conduit. However, this design means that the second conduit must have an end section of suitable length and wall thickness. The end section is therefore costly in terms of material, particularly if the second conduit is a connecting piece which is formed on the receptacle wall, for example, the radiator of a motor vehicle.

SUMMARY OF THE INVENTION

Accordingly, it is an object of the invention to provide a quick connect coupling for connecting a first fluid conduit to a second fluid conduit, wherein a coupling ring is form-lockingly connected to a sleeve which embraces the first conduit between two corrugations therein. The coupling ring has elastically flexible retaining arms which grip a radial securing surface of the second conduit upon coaxial engagement of the conduits to form an axial connection therebetween. At least one sealing ring is provided in an annular space which is delimited by the mutually engaged fluid conduits, by an inner shoulder of the second conduit, and by the corrugations closest to the free end of the first conduit. The second conduit has a conical flank which widens radially towards its free end. One of the corrugations bears upon the inner face of the second conduit after the first conduit has been inserted into the second conduit. A correspondingly conically shaped face at the free end of the sleeve bears against the radially widening flank of the second conduit after the first conduit has been inserted into the second conduit.

It is a further object of the present invention to provide a quick connect coupling which requires less material for the second conduit but still ensures sufficient resistance against lateral deflection of the first conduit in the second conduit.

It is a further object of the present invention to provide a quick connect coupling wherein only the conical end of the sleeve projects into the second conduit, which is therefore suitably short and thin-walled in design. Sufficient radial support of the first conduit in the second conduit is ensured since the first conduit bears both by way of the front corrugation and also by way of the conical end of the sleeve on the inner side of the second conduit. By positioning the conical end of the sleeve against the conical inner flank of the second conduit, it is also ensured that the first conduit is only inserted into the second conduit to a limited extent. Therefore, the sealing ring arranged in the annular space cannot be inserted too far axially. At the same time, the conical shape of the ends of the second conduit and of the sleeve facilitates insertion and centering of the end of the sleeve into the end of the second conduit.

It is a further object of the present invention to provide a quick connect coupling wherein the sleeve has a first collar which forms one wall of an annular groove and receives the coupling ring on the outside of tile sleeve adjacent to the conically shaped face. Thereby, the first collar rests on the front end of the second conduit and assists in preventing lateral deflection of the first conduit when the first conduit is inserted into the second conduit. At the same time, the first collar assists in preventing the first conduit from being inserted too far into the second conduit.

It is a further object of the present invention to provide a quick connect coupling wherein the other wall of the annular groove is formed by a second collar having a substantially smaller external diameter than the first collar and an inclined flank, over and beyond which the coupling ring can be pushed under radial deformation of the second collar so that the coupling ring engages the annular groove.

DETAILED DESCRIPTION OF THE INVENTION

Figure 1:
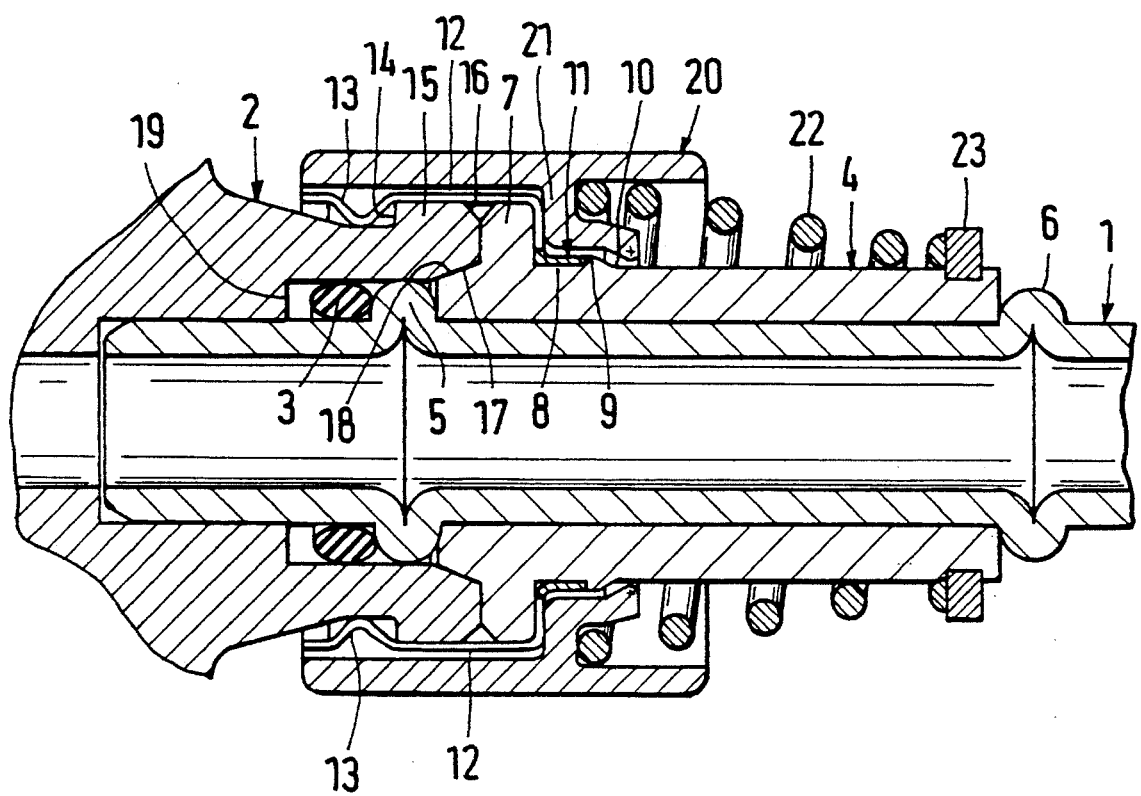
FIG. 1 is a cross-sectional view of the preferred quick connect coupling according to the present invention.

Referring to FIG. 1, a preferred quick connect coupling comprises a first fluid conduit 1 and a second fluid conduit 2 both of which are made of corrosion-resistant metal. The first fluid conduit 1 is inserted coaxially into the second fluid conduit 2 with an O-ring shaped sealing ring 3 disposed between the two fluid conduits 1, 2. A separate sleeve 4 encloses the first conduit 1 and is form-lockingly held between two corrugations 5, 6, formed by axially compressing the first conduit 1 such that the sleeve 4 is restrained against axial displacement relative to the first conduit 1. The sleeve 4 has a collar 7 which forms one wall of an annular groove 8 on the outside of the sleeve 4. Another collar 9, which is of considerably smaller external diameter and which has an inclined flank 10, forms the other delimiting wall of the annular groove 8. A coupling ring 11 is engaged in the annular groove 8 after it has been pushed over and beyond the flank 10 and the collar 9 with slight radial deformation of the collar 9 until it abuts on the collar 7. The coupling ring 11 has axial retaining arms 12 integral therewith which are elastically flexible in the radial direction. The retaining arms 12 engage over the collar 7 and are distributed in a peripheral arrangement at equal angular spacings. In the vicinity of its free end, each retaining arm 12 has a radially inwardly oriented projection 13 with inclined flanks. The projection 13 engages behind a radial securing surface 14 on the side of a peripheral holding rib 15, remote from the free end of the second fluid conduit 2. A radially outer flank 16 is inclined conically at the side towards the free end of the second fluid conduit 2. The radially inner side of the second fluid conduit 2 also has a conical flank 17 which widens radially towards the free end of the second fluid conduit 2. The flank 17 rests on a corresponding face 18 formed at the free end of the sleeve 4 so that the flank 17 and the face 18 fit uniformly after the first conduit 1 has been inserted into the second conduit 2. Similarly, the corrugation 5 bears radially upon a cylindrical inner face of the second conduit 2 after the first conduit 1 has been inserted into the second conduit 2. An annular space which receives the sealing ring 3, is delimited by an inner shoulder 19, by the inner peripheral face of the second conduit 2, by the corrugation 5 and by the outer peripheral face of the first conduit 1.

In addition, a safety sleeve 20 embraces the sleeve 4. The safety sleeve 20 has a radially inwardly extending peripheral flange 21 which is urged over the coupling ring 11 by a conical helical spring 22. The helical spring 22 also bears against a C-shaped retaining ring 23 which is inserted into a groove adjacent the other end of the sleeve 4. The safety sleeve 20 prevents radial spreading of the retaining arms 12 in the position shown in FIG. 1. The fluid conduits 1, 2 are able to be disconnected only when the safety sleeve 20 has released the retaining arms 12, against the force of the helical spring 22, by axial withdrawal. With the first conduit 1 being withdrawn from the second conduit 2, the retaining arms 12 spread due to the axial pressure applied by the holding rib 15 to the inwardly oriented projections 13. Conversely, it is only possible to couple the fluid conduits 1, 2 together when the safety sleeve 20 is in the withdrawn position.

The first conduit 1 can be of equal wall thickness throughout and be made of a high-grade material which is resistant to corrosive fluids, whereas the sleeve 4 can be made more easily of a cheaper material, for example, by injection molding of plastics material. Finally, the first conduit 1 can be an existing conduit which is used to convey fluid such as a fuel or oil pressure conduit in cars. This may be provided with the corrugations 5 and 6 after the sleeve 4 has been placed thereon.

While the embodiment of the invention shown and described is fully capable of achieving the results desired, it is to be understood that this embodiment has been shown and described for purposes of illustration only and not for purposes of limitation. Other variations in the form and details that occur to those skilled in the art and which are within the spirit and scope of the invention are not specifically addressed. Therefore, the invention is limited only by the appended claims.

What is claimed is:

1. A quick connect coupling, comprising:

a first fluid conduit having first and second corrugations, said first corrugation positioned closest to the free end of said first fluid conduit;

a second fluid conduit in which said first fluid conduit is coaxially engaged, said second fluid conduit having an inner shoulder;

a sleeve for embracing said first fluid conduit between said first and second corrugations;

a coupling ring form-lockingly connected to said sleeve, said coupling ring having elastically flexible retaining arms which grip a radial securing surface of said second fluid conduit upon coaxial engagement of said first and second fluid conduits to form an axial connection therebetween;

at least one sealing ring provided in an annular space delimited by said first and second fluid conduits after said first conduit has been coaxially engaged in said second conduit, said annular space being defined by said inner shoulder of said second fluid conduit and by said first corrugation;

a conical flank on said second conduit which widens radially toward the free end of said second conduit, said first corrugation bearing upon the inner face of said second fluid conduit after said first fluid conduit has been coaxially engaged in said second fluid conduit; and a correspondingly conically shaped face at the free end of said sleeve bearing against said radially widening flank of said second fluid conduit after said first fluid conduit has been coaxially engaged in said second fluid conduit.

2. The quick connect coupling of claim 1, wherein said sleeve has a first collar which forms a first wall of an annular groove to receive said coupling ring on the outside of said sleeve and which is adjacent to said conically shaped face.

3. The quick connect coupling of claim 2, wherein said sleeve has a second collar which forms a second wall of said annular groove, said second collar having a substantially smaller external diameter than said first collar and an inclined flank over and beyond which said coupling ring can be pushed under radial deformation of said second collar so that said coupling ring engages said annular groove.

* * * * *